July 7, 1959 H. P. VELLENZER 2,893,497

ROTARY HOE

Filed Nov. 28, 1956 2 Sheets-Sheet 1

INVENTOR

Hans Peter Vellenzer

July 7, 1959 H. P. VELLENZER 2,893,497

ROTARY HOE

Filed Nov. 28, 1956 2 Sheets-Sheet 2

INVENTOR

Hans Peter Vellenzer

United States Patent Office
2,893,497
Patented July 7, 1959

2,893,497

ROTARY HOE

Hans Peter Vellenzer, Plochingen, Germany

Application November 28, 1956, Serial No. 624,916
2 Claims. (Cl. 172—42)

The present invention relates to a direct-driven rotary hoe and more particularly to a motor cultivator with rotary knives or tines whose internal combustion engine is arranged over its working shaft.

Agricultural machines of this type are already known. They possess the decided advantage that they are light in weight, but at the same time they have the disadvantage that they are long in construction and therefore cannot be carried by the operator. In addition, this large over-all length of the horizontally arranged power unit results in the additional disadvantage that the cultivator cannot be driven so close to bush-type plants, as is desirable for good results of cultivation.

It is therefore an object of the present invention to overcome the above drawbacks by providing a rotary hoe or tiller construction, in which the power unit is more advantageously concentrated over the working shaft than in prior known machines.

It is another object of the present invention to provide a rotary hoe or tiller construction wherein the crankshaft of the internal combustion engine as well as the drive shaft of the transmission meshing with the working shaft extends vertically above the latter. This results in the advantage that the center of gravity of the machine is located above the working shaft, so that supporting wheels and other accessories can be placed very close to the working shaft, as they need contribute but little to the balancing of the machine.

With these and other objects in view, which will become apparent in the following detailed description, the present invention will be clearly understood in connection with the accompanying drawings, in which.

Figures 1, 2:
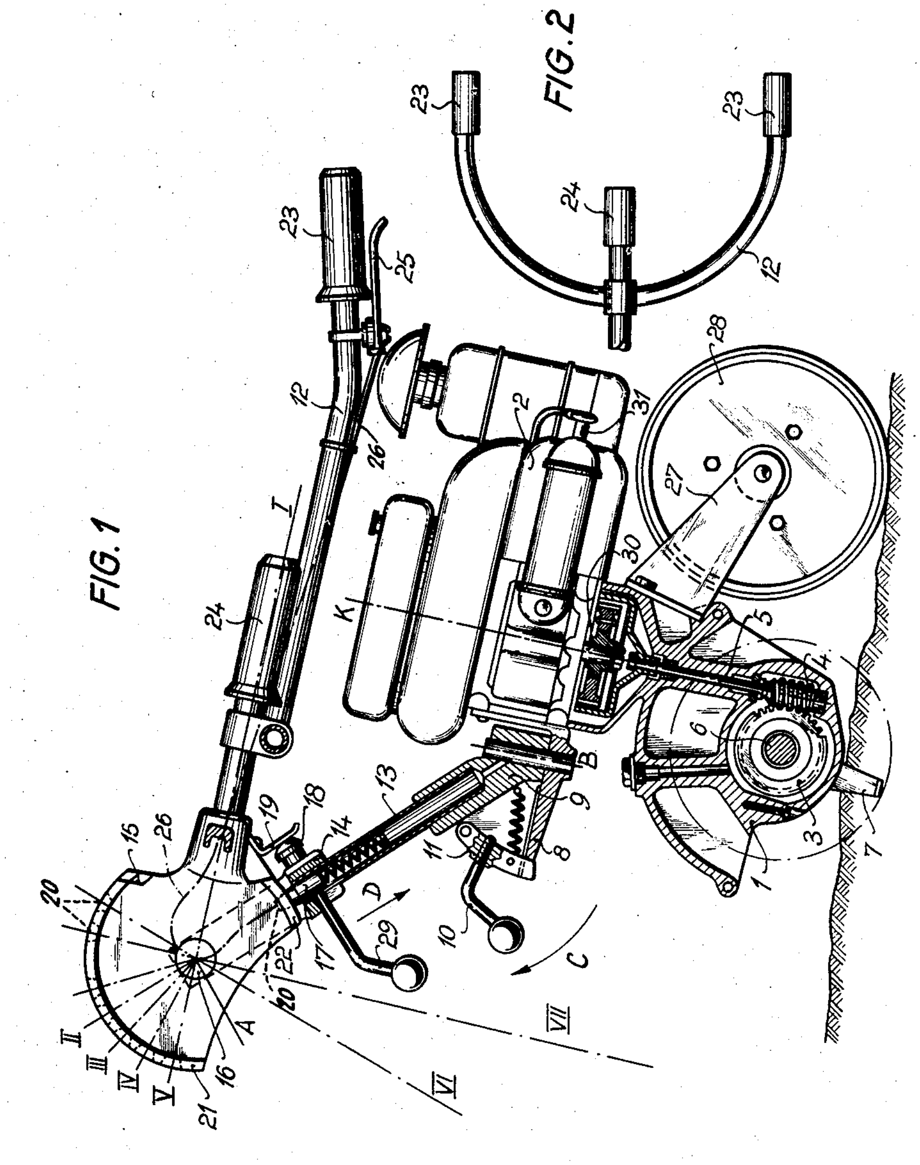
Figure 1 is a part sectional side elevational view of the rotary hoe or tiller constructed in accordance with the present invention and showing the machine after it has been set on the ground prior to converting it from the transporting condition into operating condition.
Fig. 2 is a to plan elevational view of the handle-bar fork.
Figure 3:
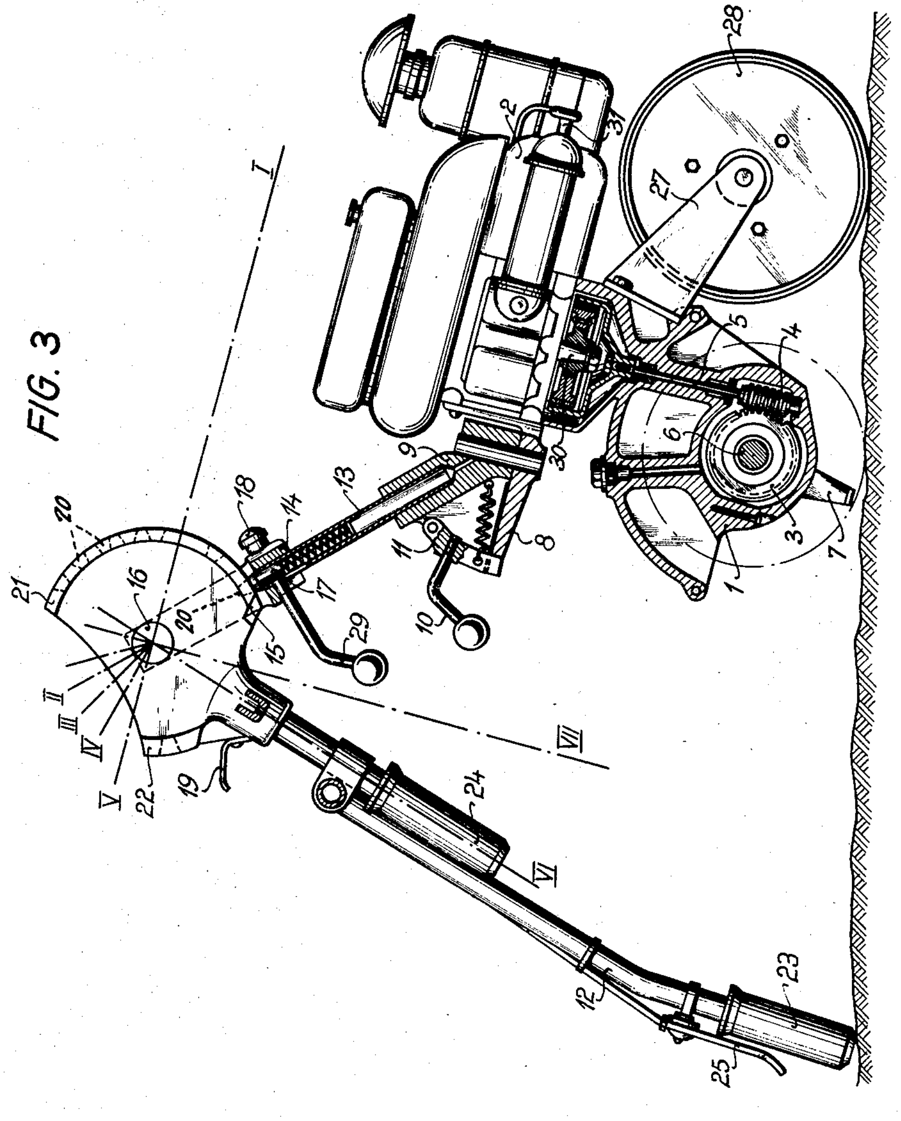
Fig. 3 is a view similar to that of Fig. 1 but showing the machine in the position in which the working shaft and its knives or tines are exchanged.

Referring now to the drawings, it will be seen that the invention, illustrated in Figs. 1 to 3, includes a housing 1 on which is flanged a one-cylinder internal combustion engine 2 having a substantially horizontally arranged cylinder in such a manner that its crankshaft is vertically disposed. A clutch or other power-transmission agent is in known manner connected to the crankshaft so that the worm 4 of the drive shaft 5 meshing with the worm gear 3 runs coaxial to the crankshaft axis K. The worm gear 3 drives the working shaft 6 which for the purpose of changing the working width is interchangeable and carries the knives or tines 7. Fitted to that part of the crankshaft housing located oppositely to the cylinder of the internal combustion engine is an L-shaped supporting bracket 8 on which the bar-carrier support 9 is so mounted as to be turnable about the axis B which runs parallel to the crankshaft axis K. The horizontally extending leg of the bracket 8 is provided with slot-shaped notches which—after the completion of a selective movement of the handle-bar fork 12 about the axis B—may be engaged by the spring-loaded latch 11 which is provided with a control lever 10 and turnable in the direction of the arrow C. The bar-carrier support 9 carries the bar carrier 13 having a head 14 on which is mounted the swivel-head 15 of the handle-bar fork 12 by means of a bolt 16, so as to be turnable about the axis A. The spring-loaded catch-bolt 17 for locking the handle-bar fork 12 is axially movably mounted in the bar carrier 13. The bar carrier 13 also carries the knob 18 including a switch (not shown) for opening or closing the ignition circuit of the internal combustion engine, wires (not shown) leading from said knob to said engine. The swivel head 15 also carries the blade spring 19 associated with the knob 18 and operating said switch upon engagement with said knob 18. The locking holes 20 cooperating with the catch-bolt 17 are located over an arc of about 270° on the sectors 21 and 22 of the swivel head 15 which besides the handle-bar fork 12 with its operating handles 23 carries also the carrier handle 24. The accelerator lever 25 is connected by means of the Bowden cable 26 to the fuel feed control of the internal combustion engine.

The fork 27 of the supporting wheel 28 is likewise mounted on the housing 1. The hand lever 29 engages and operates the catch-bolt 17. The center of gravity of the rotary hoe is located approximately in the center of the crank-case housing of the internal combustion engine from which protrudes the end of the crankshaft 30. Located in the end of the cylinder of the internal combustion engine is the spark plug 31.

Prior to adjusting the rotary hoe, weighing about 20 kg. for operation, the handle-bar fork, according to Fig. 1, is to be swung into the transport position I so that the rotary hoe may be lifted by the carrier handle 24. Out of this transport position I, the handle-bar fork 12 may be swung about more than 90 degrees, i.e., so far until it is locked in one of the operating positions II through V by the catch-bolt 17. The angle of horizontal swing of the handle-bar fork is then set by the engagement of the catch-bolt 17 in the respective locking holes 20, rendering the rotary hoe ready for operation.

Should it be desired to change the working width of the machine, it will only be necessary to exchange the working shaft 6 for a longer or shorter one. As the rotary hoe can be operated by just one operator, it is therefore of advantage that the handle-bar fork may be swung into the supporting position VI according to Fig. 3. In this position the machine rests actually on three legs, i.e. on the two operating handles 23, as well as on the supporting wheel 28. Prior to the swinging of the handle-bar fork unlocking of the latch-bolt 17 is effected by moving the operating handle 29 in direction of the arrow D. Should it, in addition, be desired, for example, to remove the supporting wheel 28 together with its fork 27, which is often desirable in connection with the enlarging of the working width, the handle-bar fork is then swung into the position VII and the entire machine tipped about 90 degrees, the operating handles being the tipping points. The machine rests then on three legs, i.e. on the two handle bars of the handle-bar fork and on the swivel head 15.

When the machine is again converted into the transporting condition according to Fig. 1, the blade spring 19 then engages the knob 18, whereby the ignition circuit of the internal combustion engine is disconnected by a switch and thus effected a condition insuring that the machine is rendered inoperative while it is transported.

Housing 1 and internal combustion engine 2 are connected together by bolts or resilient clamping yokes (both not shown in the drawings). Loosening the bolts or the clamping yokes will render it possible to disconnect the internal combustion engine 2 together with the supporting bracket 8 and the handle-bar fork 12 from the housing 1 so that these subassemblies will come apart at their engaging faces disposed concentrically to the drive shaft 5. The assembly 2, 8 and 12 may then be mounted on another attachment, for example, a lawn mower.

It will be obvious that various modifications may be made in the embodiment above described without in any way departing from the spirit of the invention as defined in the appended claims.

While I have disclosed one embodiment of the present invention, it is to be understood that this embodiment is given by example only and not in a limiting sense, the scope of the present invention being determined by the objects and the claims.

What is claimed is:

1. In an agricultural implement, including an agricultural tool, a housing, a working shaft carrying said tool for rotation therewith and rotatably mounted in said housing, a motor secured to said housing substantially vertically over said working shaft and having a drive shaft, means operatively connecting said drive shaft with said working shaft, a supporting wheel disposed immediately in advance of said working shaft, the improvement comprising an upwardly inclined bar carrier support fitted to the rear side of said motor and having an axial boring, a head mounted on the upper end of said support, a sector-shaped swivel head rotatably mounted on said support head and having a plurality of peripheral locking holes over an arc of 270°, a spring-loaded catch-bolt reciprocable within said boring of said support and cooperating with said swivel head for locking the latter in a plurality of angularly spaced apart positions, a hand lever operating said catch bolt, a bar forking into handle bars extending from said swivel head, a carrying handle fitted coaxially into the apex of the fork, said bar forming a support for carrying said implement in one of said positions of said swivel head, forming together with said wheel a three-point stand raising said tool off the ground in another of said positions of said swivel head, and forming together with said swivel head a three-point stand raising said tool and said wheel off the ground in a third of said positions of said swivel head.

2. The implement, as set forth in claim 1, which includes a motor ignition switch mounted on the upper portion of said bar carrier support and a blade spring extending from said swivel head arranged to open said switch upon said bar being turned into carrying position.

References Cited in the file of this patent

UNITED STATES PATENTS

| | | |
|---|---|---|
| 2,070,830 | Gravely | Feb. 16, 1937 |
| 2,379,805 | Johnston | July 3, 1945 |
| 2,535,701 | Shaw | Dec. 26, 1950 |
| 2,622,498 | Wharton | Dec. 23, 1952 |
| 2,691,928 | Kelsey et al. | Oct. 19, 1954 |

FOREIGN PATENTS

| | | |
|---|---|---|
| 839,783 | France | Jan. 7, 1939 |
| 247,623 | Switzerland | Mar. 31, 1947 |